United States Patent
Davis

(10) Patent No.: US 10,306,949 B2
(45) Date of Patent: Jun. 4, 2019

(54) PIN PLATE FOR CONSTRUCTION OF AN ARTICLE

(71) Applicant: NIKE, Inc., Beaverton, OR (US)

(72) Inventor: Carrie L. Davis, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 199 days.

(21) Appl. No.: 15/494,104

(22) Filed: Apr. 21, 2017

(65) Prior Publication Data
US 2017/0224058 A1    Aug. 10, 2017

Related U.S. Application Data

(62) Division of application No. 14/444,325, filed on Jul. 28, 2014.

(51) Int. Cl.
*B25B 11/00*    (2006.01)
*A43D 5/02*     (2006.01)
(Continued)

(52) U.S. Cl.
CPC ............... *A43D 5/02* (2013.01); *A43B 23/00* (2013.01); *A43D 8/00* (2013.01); *A43D 11/00* (2013.01);
(Continued)

(58) Field of Classification Search
CPC .... B25B 1/00; B25B 1/02; B25B 5/00; B25B 5/02; B25B 5/145
See application file for complete search history.

(56) References Cited

U.S. PATENT DOCUMENTS

| | | | |
|---|---|---|---|
| 4,200,272 A | * | 4/1980 | Godding ................ B23Q 1/035 269/26 |
| 4,572,564 A | * | 2/1986 | Cipolla ................. B25B 1/2421 269/266 |

(Continued)

FOREIGN PATENT DOCUMENTS

| | | |
|---|---|---|
| AT | 373299 B | 1/1984 |
| CN | 103460365 A | 12/2013 |

(Continued)

OTHER PUBLICATIONS

International Search Report with Written Opinion dated Oct. 1, 2015 in Application No. PCT/US2015/042029, 11 pages.
(Continued)

*Primary Examiner* — Lee D Wilson
(74) *Attorney, Agent, or Firm* — Shook, Hardy & Bacon, LLP

(57) ABSTRACT

An apparatus for aligning materials in order to construct an article is provided. The apparatus may include an array of moveable pins and a solid plate having an array of holes, where the array of holes is aligned with the array of pins. Each pin may be extended and/or retracted by a programmable actuator array. When a pin is extended, at least a portion of the pin may extend through the hole with which it is aligned, such that at least a portion of the pin extends beyond the solid plate. A fraction of the total number of pins in the array of pins may be extended by the programmable actuator array. The particular pins that are to be extended may be based on a pattern for an article. A material that is to be used in constructing the article may be aligned using the extended pins.

20 Claims, 9 Drawing Sheets

(51) Int. Cl.
  *A43D 11/00* (2006.01)
  *B23Q 3/18* (2006.01)
  *B23P 19/10* (2006.01)
  *B25B 11/02* (2006.01)
  *B26D 7/01* (2006.01)
  *A43B 23/00* (2006.01)
  *A43D 8/00* (2006.01)

(52) U.S. Cl.
  CPC .............. *B23P 19/10* (2013.01); *B23Q 3/186* (2013.01); *B25B 11/00* (2013.01); *B25B 11/02* (2013.01); *B26D 7/01* (2013.01); *Y10T 29/49998* (2015.01); *Y10T 29/53013* (2015.01)

(56) References Cited

U.S. PATENT DOCUMENTS

| | | | |
|---|---|---|---|
| 5,020,405 A | | 6/1991 | Wolfson et al. |
| 5,090,669 A | | 2/1992 | Pieroni |
| 5,889,675 A | | 3/1999 | Minami et al. |
| 5,984,293 A | * | 11/1999 | Abrahamson .......... B23Q 1/035 |
| | | | 269/236 |
| 6,032,348 A | | 3/2000 | Haas et al. |
| 6,775,904 B1 | * | 8/2004 | Duebel .............. H05K 13/0069 |
| | | | 269/266 |
| 6,799,757 B1 | * | 10/2004 | Lang ................... B25B 1/2463 |
| | | | 269/266 |
| 8,534,728 B1 | | 9/2013 | Bosscher et al. |
| 9,629,419 B2 | * | 4/2017 | Davis ...................... A43D 5/02 |
| 2002/0089109 A1 | * | 7/2002 | Guimont .............. B25B 1/2405 |
| | | | 269/266 |
| 2006/0108729 A1 | * | 5/2006 | Siegel ...................... B25B 1/08 |
| | | | 269/266 |
| 2006/0151930 A1 | | 7/2006 | Moncavage |
| 2006/0244190 A1 | * | 11/2006 | Erdmann ........... H05K 13/0069 |
| | | | 269/266 |
| 2010/0164160 A1 | | 7/2010 | Stevenson et al. |
| 2011/0291342 A1 | * | 12/2011 | Gindy ................... B25B 1/2421 |
| | | | 269/266 |
| 2012/0264320 A1 | | 10/2012 | Parrish et al. |
| 2013/0125319 A1 | | 5/2013 | Regan |
| 2016/0021982 A1 | * | 1/2016 | Davis ...................... A43D 5/02 |
| | | | 29/559 |
| 2017/0224057 A1 | * | 8/2017 | Davis ...................... A43D 5/02 |

FOREIGN PATENT DOCUMENTS

| | | |
|---|---|---|
| DE | 2817058 A1 | 4/1979 |
| DE | 2819441 A1 | 11/1979 |
| DE | 19616204 A1 | 1/1997 |
| WO | 2013074941 A1 | 5/2013 |

OTHER PUBLICATIONS

Notice of Allowance dated Dec. 21, 2016, in U.S. Appl. No. 14/444,325, 5 pages.

Ex Parte Quayle Action dated Sep. 23, 2016 in U.S. Appl. No. 14/444,325, 4 pages.

Non-Final Office Action dated Jan. 25, 2019 in U.S. Appl. No. 15/494,066, 13 pages.

* cited by examiner

PIN PLATE FOR CONSTRUCTION OF AN ARTICLE

CROSS-REFERENCE TO RELATED APPLICATIONS

This divisional application, entitled "Pin Plate for Construction of an Article," is claiming the benefit under 35 U.SC. 121 of the prior-filed application Ser. No. 14/444,325, filed Jul. 28, 2014, and entitled "Pin Plate for Construction of an Article." The entirety of the aforementioned application is incorporated by reference herein.

TECHNICAL FIELD

Exemplary aspects hereof relate to systems and methods for article manufacturing, such as flexible article manufacturing.

BACKGROUND

Generally, methods and systems for the assembly and production of flexible articles, such as garments and shoes, may be highly variable and require a great deal of human oversight. Shoe manufacturing, for example, involves a multitude of steps that vary greatly based upon the style of shoe involved. Such steps might include printing, stitching, forming, and the like. Moreover, due to variability in size and style, shoe production machinery and other apparatuses are designed and machined specifically for a particular style line and/or size.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Exemplary aspects hereof include an apparatus for aligning materials in order to construct an article. The article may be a flexible article, such as a shoe. The apparatus may include an array of moveable pins coupled to a pin plate, as well as a solid plate having an array of holes, where the array of holes may be aligned with the array of pins. Each pin may be extended and/or retracted by a programmable actuator array. In exemplary aspects, when a pin is extended, at least a portion of the pin extends through the hole with which it is aligned, such that at least a portion of the pin extends beyond the solid plate. A fraction of the total number of pins in the array of pins may be extended by the programmable actuator array, where the particular pins that are to be extended are based on a pattern for an article of manufacture, such as a shoe. For example, the number of pins, as well as the configuration of the pins, that are to be extended may be determined based on such a pattern. A material that is to be used in constructing the article may be aligned using the extended pins. Once aligned, the material may be subjected to various processing steps, such as stitching, printing, fusing, lasering, and the like.

In an exemplary aspect, the apparatus may include a solid plate having a face, a back, and an array of holes that extend from the back of the solid plate to the face of the solid plate. The apparatus may further include an array of pins that is aligned with the array of holes. In one example, each hole is aligned with one pin, and each pin is aligned with one hole, such that each pin may extend through the corresponding hole. When each pin is in an extended position, the pin may extend through the corresponding hole and at least partially beyond the face of the solid plate. When each pin is in a retracted position, the pin may retract behind the face of the solid plate. The apparatus may also include a programmable actuator system that is capable of individually actuating each pin of the array of pins. Individually actuating each pin may include extending and/or retracting each pin. In one aspect, the programmable actuator system may further include a locking system that temporarily secures each pin that is in an extended position. Additionally, the programmable actuator system may interface with a computing system that causes the actuator system to independently actuate each pin of the array of pins. The computing system may cause the programmable actuator system to extend at least a fraction of the total number of pins in the array of pins. The fraction may be based on a pattern for a shoe upper.

In exemplary aspects, the array of pins is comprised of greater than 1000 pins and the array of holes is correspondingly comprised of greater than 1000 holes. Each pin may have a diameter in the range of about 1 millimeter to about 10 millimeters. For example, the diameter of each pin may be about 3 millimeters. In further exemplary aspects, the diameter of each pin may be based on a material that is to be aligned. The geometry of each pin may also be based on the material that is to be aligned. Each pin may have a length, and when the pin is in an extended position, the portion of the length of the pin that extends beyond the face of the solid plate may be less than or equal to the length of the pin.

Exemplary aspects hereof may also provide a system for aligning materials to construct the upper of a shoe. The system may include a solid plate having a face, a back, and an array of holes, where each hole in the array of holes extends through the solid plate from its face to its back. The system may further include an array of moveable pins that are moveable between an extended position and a retracted position. Each pin of the array of moveable pins may have a pin length. Each pin may further have an address that corresponds to a location of a hole in the array of holes. The pin address may, additionally or alternatively, correspond to a location of the pin on a pin plate. When a pin is in a retracted position, the pin length may be behind the face of the solid plate. When a pin is in an extended position, the pin may be extended away from the face of the solid plate such that at least a portion of the pin length extends through the hole having the location corresponding to the pin address. The system may also include an actuator array that independently actuates each pin. Independently actuating each pin may include at least one of extending and retracting each pin based on the respective pin address for each pin. The system may additionally include a computing system that interfaces with the actuator array to cause the actuator array to perform at least one of extending and retracting each pin based on a pattern corresponding to a shoe design.

In further exemplary aspects, a method may be provided for aligning one or more materials to construct an article. The method may include programming a computing system interfaced with an actuator array. The programming may be based on an extension pattern for an extendable array of pins, where the extension pattern determines alignment pins that are to be in an extended position. In one example, the extension pattern is based on a design for a shoe upper, as well as materials to be aligned during construction of the shoe upper. The alignment pins may be a set of the extendable array of pins, and any remaining pins in the extendable array of pins that are outside of the set may be retracted pins. In one example, the extension pattern includes two sets of pins within the extendable array of pins: (1) alignment pins that are to be in the extended position and (2) retracted pins that are to be in a retracted position, or that are not to be in the extended position. The method may further include using the actuator array to extend the alignment pins through an array of holes in a solid plate having a face and a back. When the alignment pins are in the extended position, they may extend at least partially beyond the face of the solid plate. When the retracted pins are in the retracted position, they may be retracted behind the back of the solid plate. The method may also include reversibly fixing at least one material to the alignment pins and modifying the at least one material. Modifying the material may include one or more of printing, sewing, or fusing the material.

The method may additionally include locking the extendable array of pins such that the alignment pins are fixed in the extended position and the retracted pins are fixed in the retracted position. The method may also include unlocking the alignment pins and using the actuator array to retract the alignment pins through the array of holes such that the alignment pins are retracted behind the back of the solid plate.

In additional exemplary aspects hereof, a method for aligning materials to construct a shoe upper is provided. The method may include assigning, based upon a shoe upper design, to each pin of an array of pins either an extended position or a retracted position. An actuator array configured to independently actuate each pin of the array of pins may be used to move each pin to its assigned position. Each pin assigned to the extended position may extend at least partially beyond a face of a solid plate through a hole of an array of holes in the solid plate, where the holes extend from a back of the solid plate to the face of the solid plate. Each pin assigned to the retracted position may be retracted behind the face of the solid plate. The method may further include reversibly fixing at least one material used to construct the shoe upper to each pin in the extended position. The method may also include modifying the at least one material. The at least one material may be a textile.

BRIEF DESCRIPTION OF THE DRAWINGS

The present disclosure makes reference to the attached drawing figures, wherein.

Corresponding reference numerals indicate corresponding parts throughout the several views of the drawings.

DETAILED DESCRIPTION

The subject matter hereof may be described with specificity to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies.

Aspects hereof provide a pin plate alignment system that may be used to align and stabilize materials during a manufacturing process. In particular, the pin plate alignment system may align portions of a flexible object, such as a shoe, during manufacturing, thereby substantially reducing variation in the finished product and ensuring that the finished product is reproducible. By way of example, the pin plate alignment system may be utilized during modifications of a material, where such modifications might include printing, forming, lasering, stitching, fusing, embroidering, and the like. As used herein, "material" may refer to one or more raw materials to be used in constructing an article of manufacture, as well as to one or more materials included in a partially constructed article of manufacture. In one instance, a manufacturing process may include individually manufacturing an outsole, a midsole, and an upper portion of a shoe. When combined, these three parts may form a completed shoe. The pin plate alignment system may be used in the manufacture of the upper portion of a shoe, and may also be used to align portions of the upper during various shoe manufacturing process steps.

The pin plate alignment system not only reduces variation in the shoe manufacturing process, but it may also be adapted to a variety of designs. For example, a woman's shoe upper and a child's shoe upper may have substantially differing patterns and pieces of material for alignment. To accommodate such variations, the pin plate alignment system may feature a set of alignment pins that may be individually extended and/or retracted via a programmable actuator array. The pins that are extended may form the alignment pins for aligning portions of the item under construction, such as the pieces of a shoe upper. Based on the pattern or design of a shoe or other item, pins may be extended and/or retracted via the actuator array to form a new alignment pin pattern for each different design. For example, a shoe manufacturer may rely on the pin plate alignment system for aligning materials to construct any style and/or size of shoe, rather than relying on alignment devices that are specifically machined for each style and/or size of shoe.

Figure 1:
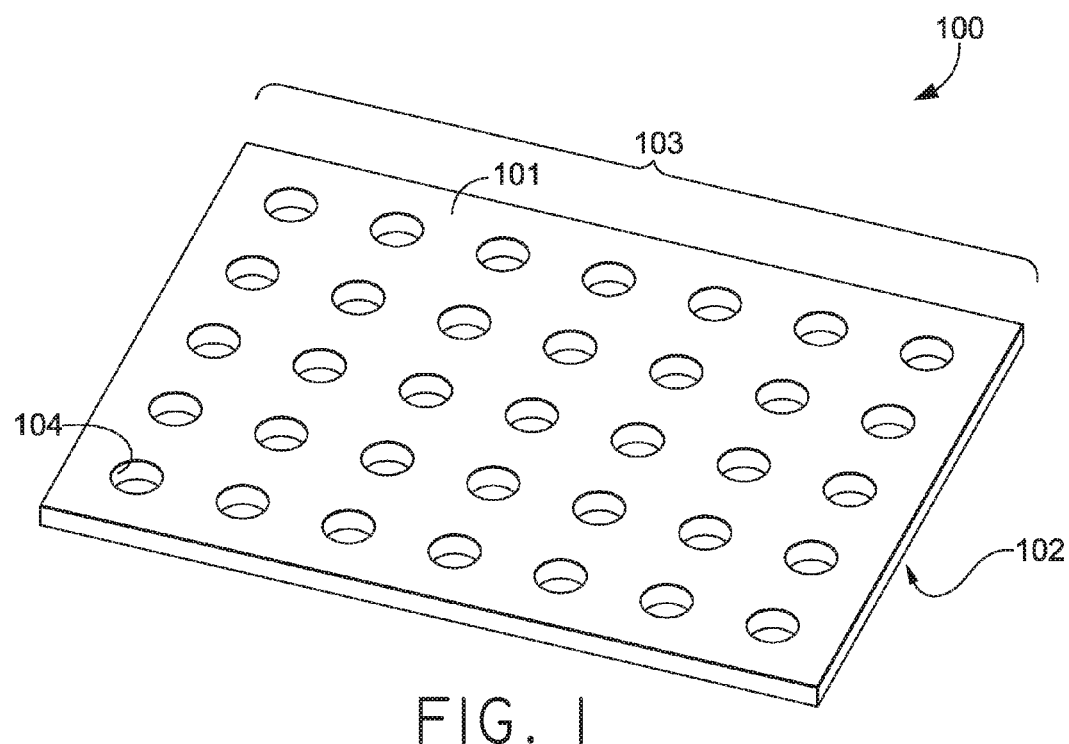
FIG. 1 depicts a top perspective view of an exemplary solid plate having an array of holes, in accordance with an exemplary aspect hereof.

Referring initially to FIG. 1, an exemplary solid plate 100 having a face 101 and a back 102 is illustrated. The solid plate 100 may include an array of holes 103, such as the hole 104. As illustrated, these holes may extend from the back 102 to the face 101 of the exemplary solid plate 100. The solid plate may be used as part of a radio frequency welder, heat press, or other means for constructing an article, such as a shoe. The exemplary solid plate may be machined or otherwise constructed from any material compatible with the processing steps for manufacturing an article, such as a shoe, that is at least partially constructed from one or more materials.

The array of holes 103 may be machined or tooled to achieve a particular diameter, pitch, or other desired property. A particular diameter and/or pitch may be selected based on various aspects of the material to be aligned. Such aspects may include the size, scale, configuration, pattern, and any other relevant feature of the material. In one example, each hole of the array of holes 103 may have a diameter between about 1 millimeter and about 10 millimeters. In another example, each hole has a diameter of about 3 millimeters. As used herein, the terms "about," "approximately," and "substantially," when used to describe a value, may include a range of 99% to 101% of the specified value (i.e. +/−1% of the specified value). For example, a diameter of "about 3 millimeters" may include diameters ranging from 2.97 millimeters to 3.03 millimeters. The array of holes 103 may be uniform in size, such that each hole has a diameter that is substantially the same as the diameters of the other holes. Additionally or alternatively, the array of holes 103 may include holes of varying sizes, such that the diameter of one hole differs from the diameter of another hole. The number of holes included in the array of holes may depend on various aspects of the material to be aligned. Such aspects may include the size, scale, configuration, pattern, and any other relevant feature of the material. In one example, the array of holes 103 includes approximately 1000 holes. As mentioned, the number of holes may be reduced or increased based on, for example, the size and scale of the material.

Figure 2:
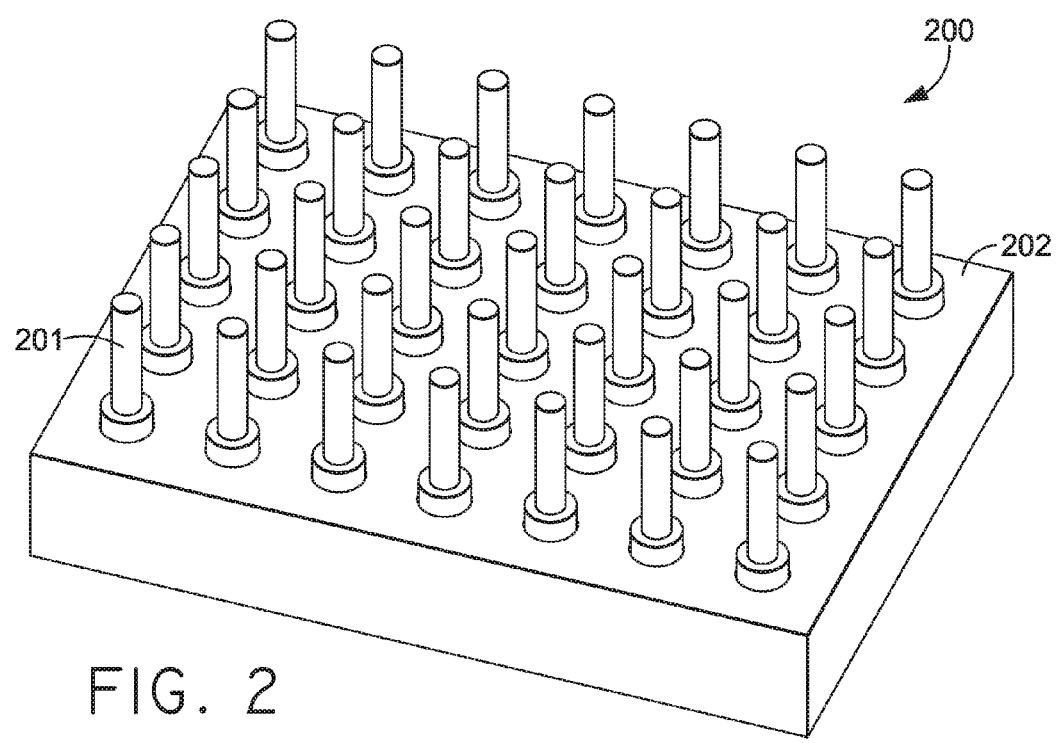
FIG. 2 depicts a top perspective view of an exemplary array of pins coupled to a pin plate, in accordance with an exemplary aspect hereof.

Referring to FIG. 2, an exemplary array of pins 200 is illustrated. As shown, the array of pins 200 may be coupled to a pin plate 202. A location at which a pin is coupled to the pin plate may correspond to a pin address. The array of pins 200 may be machined or otherwise constructed from any material compatible with the processing steps for manufacturing an article that is at least partially constructed from one or more materials, such as a shoe. The materials used for constructing the pins may be selected based on the nature of the material to be aligned. For example, the material to be aligned may be flexible, semi-flexible, semi-rigid, rigid, or a combination of these and other characteristics. Flexible materials to be aligned may include fabrics and textiles. Semi-flexible materials may include rubber, foam, and other polymeric components. Rigid materials may include hard plastics and metals. These exemplary lists are provided for illustrative purposes only. It will be understood that other materials are contemplated as being included within the scope hereof. The specific characteristics of the material to be aligned may influence a determination of the type of material that is suitable for pin construction.

Additionally, the pins may be machined to include various pin geometries. For example, the tips of the pins may be flat, rounded, conical, as well as any other number of geometric shapes suitable for the pin tip. A particular tip geometry may be selected based on a variety of factors, such as, for example, the nature of the material to be aligned. The pin bodies may also be machined to include various geometric shapes. For example, while the pins in the array of pins 200 are illustrated as having cylindrical bodies, the pins may be machined to include any number of other geometric body shapes. For example, the pin bodies may resemble a pyramid, cone, cube, prism, or any other geometric shape. In some instances, the pin bodies may be threaded. These varying shapes and features may serve to enhance grip, in addition to providing other benefits.

Each pin of the array of pins 200 may be aligned with a hole of the array of holes 103. For example, the pin 201 may be aligned with the hole 104. In particular, a center of the pin 201 may be aligned with a center of the hole 104. In one example, each hole of the array of holes 103 is aligned with one pin of the array of pins 200, and each pin of the array of pins 200 is aligned with one hole of the array of holes 103, such that each pin may extend through the corresponding hole. For example, a pin address may correspond to a location at which a particular pin is coupled to the pin plate 202. A hole of the array of holes 103 may be located such that it aligns with this pin address. Accordingly, a pin address may be associated with the location of a particular pin and a corresponding hole. In aspects, each pin has a unique pin address.

The diameter, pitch, and/or other properties of each pin in the array of pins 200 may be based on the diameter, pitch, and/or other properties of the corresponding hole of the array of holes 103. Additionally or alternatively, these properties may be based on the material to be aligned, such as the size, scale, configuration, pattern, and any other relevant feature of the material. In one example, each pin of the array of pins 200 may have a diameter between about 1 millimeter and about 10 millimeters. In another example, each pin has a diameter of about 3 millimeters. The array of pins 200 may be uniform in size, such that each pin has a diameter that is substantially the same as the diameters of the other pins. Additionally or alternatively, the array of pins 200 may include pins of varying sizes, such that the diameter of one pin differs from the diameter of another pin. The number of pins included in the array of pins may depend on various aspects of the material to be aligned. Such aspects may include the size, scale, configuration, pattern, and any other relevant feature of the material. In one example, the array of pins 200 includes approximately 1000 pins. As mentioned, the number of pins may be reduced or increased based on, for example, the size and scale of the material.

The array of pins 200 and the array of holes 103 may be uniformly distributed. For example, the array of holes 103 may be uniformly distributed across the solid plate 100, and the array of pins 200 may be similarly distributed. Additionally or alternatively, the array of pins 200 and the array of holes 103 may be non-uniformly distributed. For example, the array of holes 103 may be concentrated more densely at the perimeter, at the center, at one or more sides, or at any other portion of the solid plate. The array of pins 200 may be similarly distributed across the pin plate 202.

The array of pins 200 is merely one example of an array of pins that is suitable for use with aspects hereof. Other configurations and/or arrangements of pin arrays are contemplated.

Figure 3:
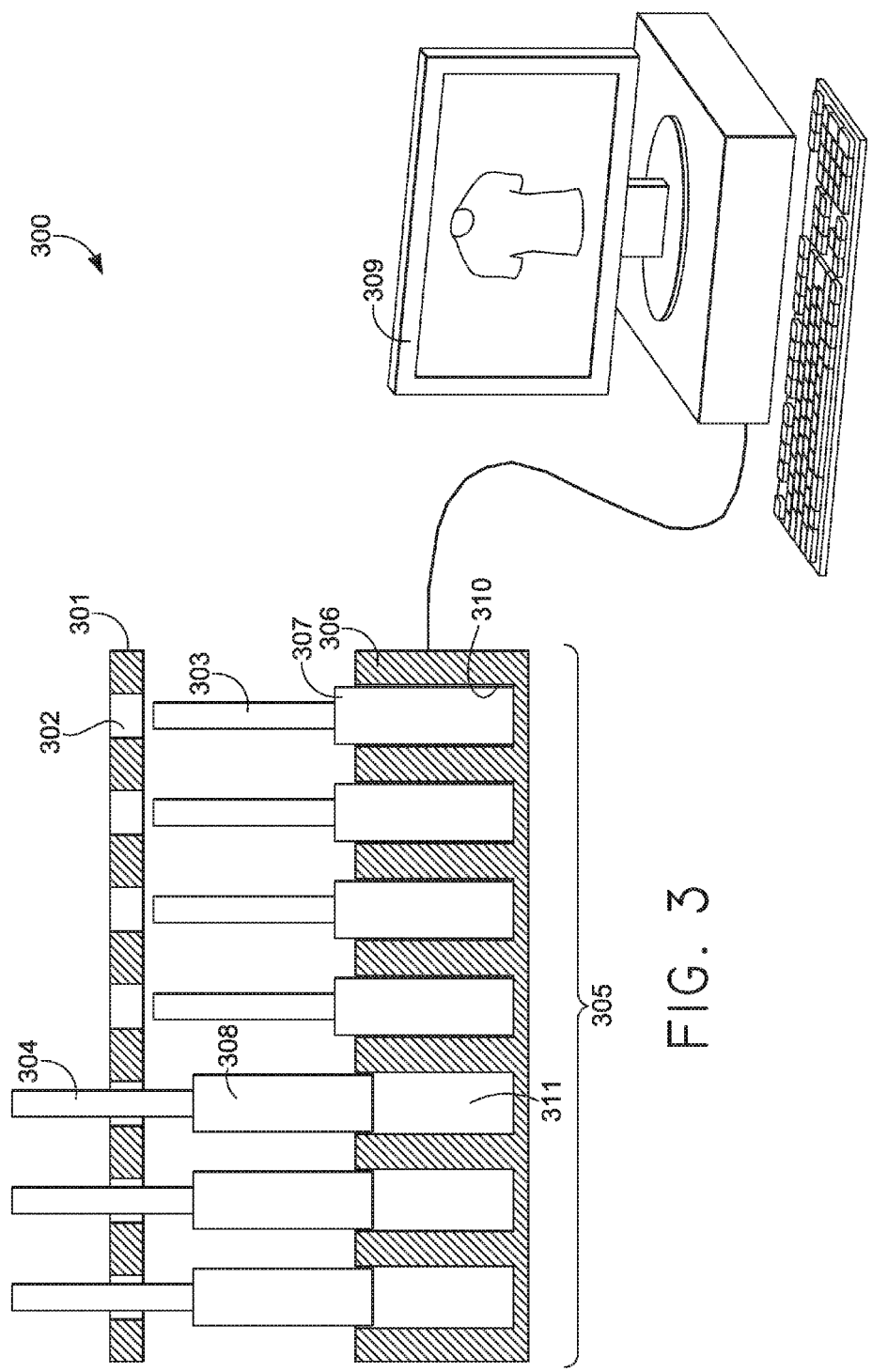
FIG. 3 depicts a cross-section of an exemplary system for aligning materials, in accordance with an exemplary aspect hereof.

Referring to FIG. 3, a cross-section of an exemplary pin plate alignment system 300 is illustrated. The exemplary system 300 includes a solid plate 301 shown in a cross-sectional view with an array of holes, including the hole 302.

The system 300 may further include an array of extendable pins, including the extended pin 304, which is in an extended position, and the retracted pin 303, which is in a retracted position. The pins may be extended and/or retracted using a programmable actuator array 305. The programmable actuator array 305 may be programmed to extend and/or retract each pin of the array of pins individually. For example, a moveable pin base, such as the pin base 308, may be raised in order to move the extended pin 304 to the extended position. Additionally, a moveable pin base, such as the pin base 307, may be lowered in order to move the retracted pin 303 to the retracted position. In one aspect, each moveable pin base may be raised and/or lowered in order to extend and/or retract the corresponding pin. As shown, the moveable pin bases may be raised out of, or lowered into, cavities, such as the cavities 310 and 311, in the pin plate 306. In aspects, the programmable actuator array 305 may include a hydraulic actuator, pneumatic actuator, electric actuator, and/or mechanical actuator. In additional aspects, other actuators may be included in the programmable actuator array 305. The exemplary pin plate alignment system 300 includes merely one example of a system having a pin plate and programmable actuator array that is suitable for use with aspects hereof. Other configurations and arrangements are contemplated.

As mentioned, the programmable actuator array 305 may be programmed to extend and/or retract each pin of the array of pins individually. This individual addressability of each pin in the array of pins may enable the pin plate array to be adapted to a variety of articles that are to be aligned, including shoes, apparel, and the like. Individual actuation of each pin also accommodates various steps included in a manufacturing process. For example, if a fraction of the total number of pins included in the array of pins is obstructing a piece of equipment, that fraction may be temporarily retracted to accommodate the piece of equipment. When the equipment has completed its function, the pins that had been temporarily retracted may be re-extended.

The programmable actuator array 305 may be programmably coupled to a computer system 309. In particular, the computer system 309 may control the programmable actuator array 305. The computer system 309 may be local to the programmable actuator array 305. Additionally or alternatively, the computer system 309 may be remote to the programmable actuator array 305. The computer system 309 may be connected wirelessly and/or via wires to the programmable actuator array 305. In the exemplary system 300, a wired connection is illustrated between the programmable actuator array 305 and the computer system 309. The computer system 309 may receive inputs corresponding to an article design and/or pattern, and the computer system 309 may then ascertain an extension pattern for the pin plate alignment system based on the design and/or pattern, as well as the type of material to be aligned and the processing to be performed. The extension pattern may refer to a pattern that identifies each individual pin that is to be extended for purposes of aligning a material. For example, an extension pattern may include pin addresses for pins that are to be in an extended position and/or pin addresses for pins that are to be in a retracted position. Extension patterns will be discussed in greater detail with respect to FIGS. 6A-6B. The computer system 309 may further control the extension and/or retraction of pins during manufacturing. For example, the computer system 309 may determine the initial configuration of extended pins (e.g., the extension pattern) and may also control the movement of pins during manufacturing, such as the temporary retraction and re-extension of pins for purposes of accommodating a piece of equipment. Additional features of the computer system 309 are discussed with respect to FIG. 11.

Figure 4:
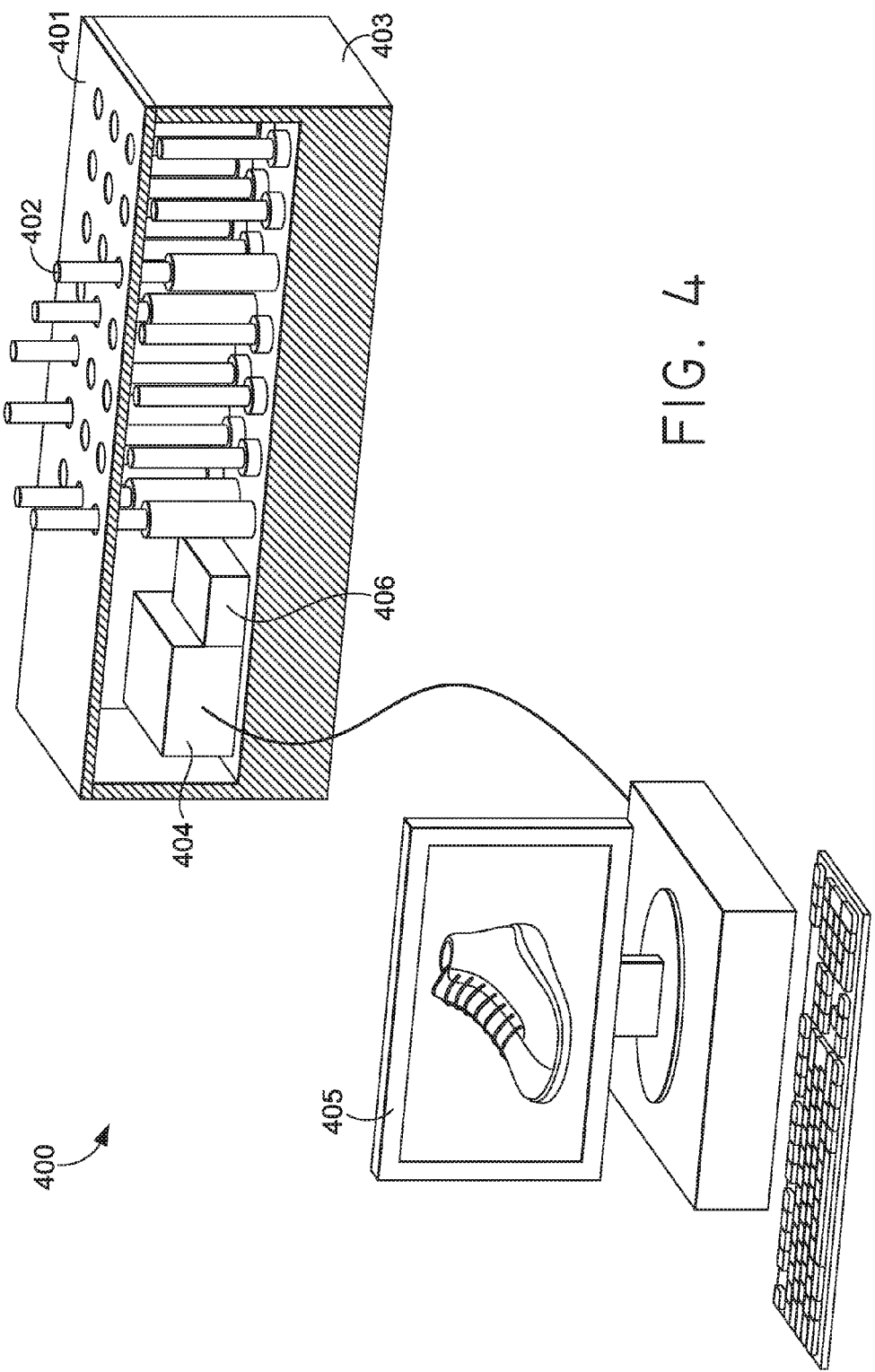
FIG. 4 depicts a cross-section of an exemplary system for aligning materials, in accordance with an exemplary aspect hereof.

Turning now to FIG. 4, another cross-sectional view of an exemplary pin plate alignment system 400 is illustrated. The system 400 may be used to align materials that are to be used in constructing a shoe. The system 400 may include a solid plate 401, an array of individually extendable and retractable pins (e.g., extended pin 402), an actuator array 404, and a locking system 406. These components may be arranged in a housing 403. Additionally or alternatively, these components may be housed separately. The housing 403, the solid plate 401, the array of pins (e.g., extended pin 402), the actuator array 404, and the locking system 406 may be stationary and/or portable to accommodate manufacturing steps and/or equipment.

The locking system 406 may fix each pin in a desired position. For example, the locking system 406 may fix the pins such that pins in an extended position remain in the extended position and pins in a retracted position remain in the retracted position. In one aspect, the locking is temporary, and the pins may later be unlocked. Locking the pins may include fixing the pins firmly in a position, such that little or no movement of the pin is permitted, as well as fixing the pins in a position that allows for a small degree of movement in the position of the pin. This small degree of movement may be referred to as "give." The locking system 406 may employ a variety of mechanisms in order to temporarily secure the pins in place. For example, a mechanical lock, electromagnetic lock, clamp, or any other number of locking mechanism may be employed. Other means of mechanically fixing the pins in place are included within the scope hereof.

The computer system 405 may be programmably coupled to the actuator array 404 and the locking system 406. For example, the computer system 405 may control each of the actuator array 404 and the locking system 406.

Figure 5:
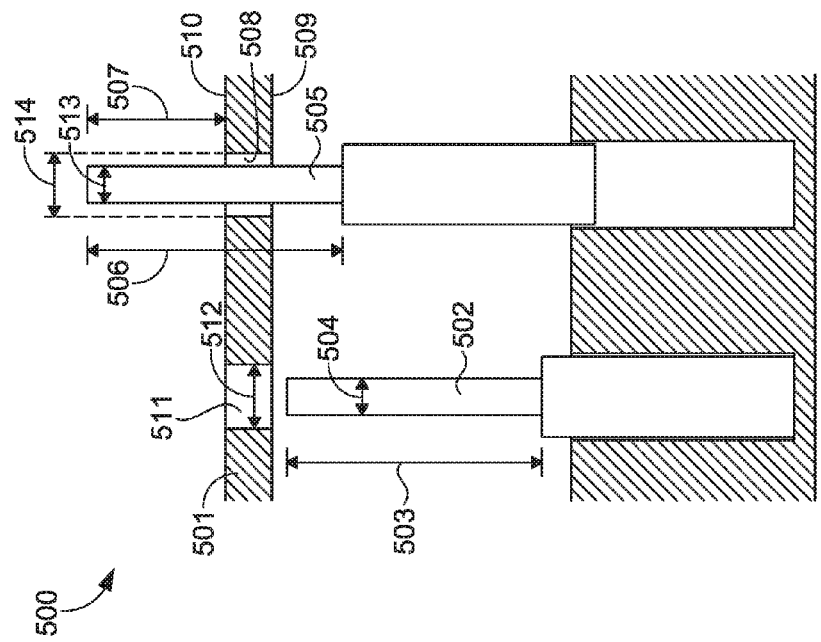
FIG. 5 depicts a portion of an exemplary system, shown in cross-section, for aligning materials, where one pin is in an extended position and another pin is in a retracted position, in accordance with an exemplary aspect hereof.

Referring to FIG. 5, an exemplary portion of a pin plate alignment system 500 is illustrated in cross-section. As shown, an exemplary retracted pin 502 is in a retracted position. The retracted pin 502 may be retracted, such as entirely retracted, behind the back 509 and/or the face 510 of the solid plate 501. The retracted pin 502 has a length 503 and a diameter 504. The retracted pin 502 may be aligned with a hole 511, which is included in an array of holes in the solid plate 501. The holes included in the array of holes may extend through the back 509 of the solid plate to the face 510 of the solid plate 501. The diameter of each hole may be selected such that a pin may extend and retract through the hole. For example, the diameter 512 of the hole 511 may be sufficiently large to allow the retracted pin 502 to extend through the hole 511 and retract back through the hole 511. In one instance, the diameter 512 of the hole 511 is greater than the diameter of the retracted pin 502.

In addition to the retracted pin 502, an extended pin 505 is shown in an extended position. The body of the extended pin 505 has a length 506 and a diameter 513. As illustrated, when the extended pin 505 is in the extended position, at least a portion 507 of the length 506 of the extended pin 505 extends through the hole 508 and beyond the face 510 of the solid plate 501. The hole 508 may have a diameter 514. As mentioned, the diameter of each hole may be selected such that a pin may extend and retract through the hole. Thus, for example, the diameter 514 of the hole 508 may be sufficiently large to allow the extended pin 505 to extend through the hole 508 and retract back through the hole 508. In one instance, the diameter 514 of the hole 508 is greater than the diameter 513 of the extended pin 505.

In aspects, the portion 507 may be less than or equal to the length 506. Additionally, the portion 507 that is to extend beyond the face 510 of the solid plate 501 may be determined based on a pattern and/or design of the article to be aligned. The portion 507 of the extended pin 505 may further be based on the type of the materials that are to be aligned. In an exemplary aspect, one or more pins may be partially retracted such that a lesser portion of the lengths of the pins is extended during manufacturing. This partial retraction may accommodate a particular piece of equipment or type of process.

Figure 6A:
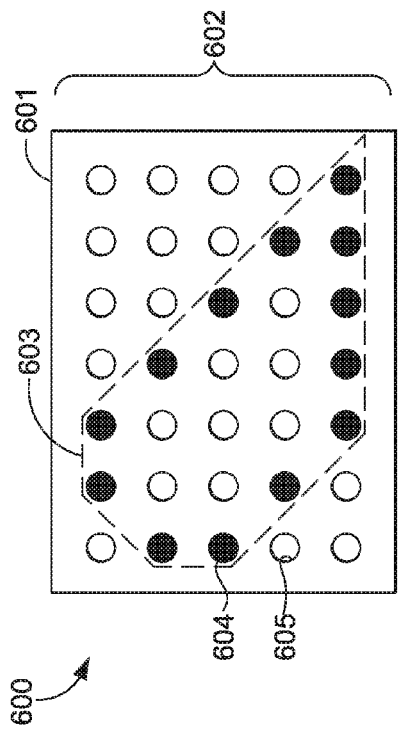
FIG. 6A depicts an exemplary extension pattern for an array of pins, in accordance with an exemplary aspect hereof.

In FIG. 6A, an exemplary extension pattern 600 is illustrated. In the extension pattern 600, an array of pins may be represented by an array of circular markers 602 on a solid plate 601. In one example, each of the circular markers 602 represents the location of a pin and its corresponding hole. For example, each marker may correspond to a pin address for a pin in the array of pins. The exemplary extension pattern 600 includes dark circles corresponding to extended pin markers, such as the extended pin marker 604, and light circles corresponding to retracted pin markers, such as the retracted pin marker 605. For a particular pattern, the extended pin markers may indicate that the pin at the location corresponding to the marker is to be in an extended position, while the retracted pin markers may indicate that the pin at the location corresponding to the marker is to be in a retracted position. The pattern indicator 603 illustrates a pattern associated with the extended pin markers. When each pin in an array of pins is extended and/or retracted according to the extension pattern 600, the fraction of pins that are in the extended position may be used to align a material (e.g., "alignment pins"), while the fraction of pins that are in the retracted position might not participate in the alignment. The fraction of pins, including the number and/or configuration of pins, that are to be in the extended position and used for alignment purposes may be based on the shape, pattern, and/or type of the material that is to be aligned.

Figure 6B:
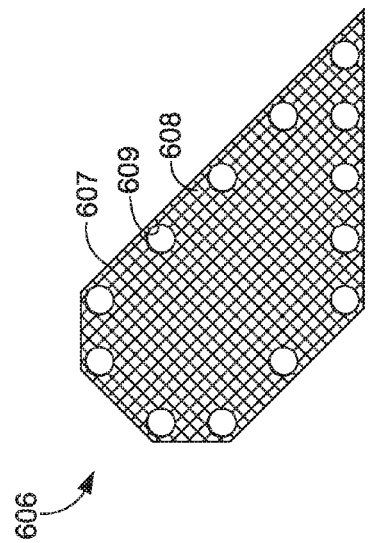
FIG. 6B depicts an exemplary material that may be aligned according to the extension pattern of FIG. 6A, in accordance with an exemplary aspect hereof.

FIG. 6B illustrates an exemplary material 606 that is compatible with the extension pattern 600. As shown, the material edges 607 correspond to the pattern indicator 603. Additionally, the material 606 includes a solid portion 608 and a number of holes, such as the hole 609. The holes in the material 606 may accommodate the alignment pins, which are to be in an extended position. For example, as illustrated, the locations of the holes in the material 606 correspond to the locations of the extended pin markers in the extension pattern 600. In other exemplary aspects, the alignment pins may puncture a piece of material, or may otherwise provide holes or another means of reversibly fixing the material to the alignment pins. In one aspect, the material may include holes designed to function in the final article, such as a shoe with an upper material having holes for laces. In this example, the holes in the upper material may both accommodate the alignment pins during manufacturing and serve a function in the final article.

Figure 7:
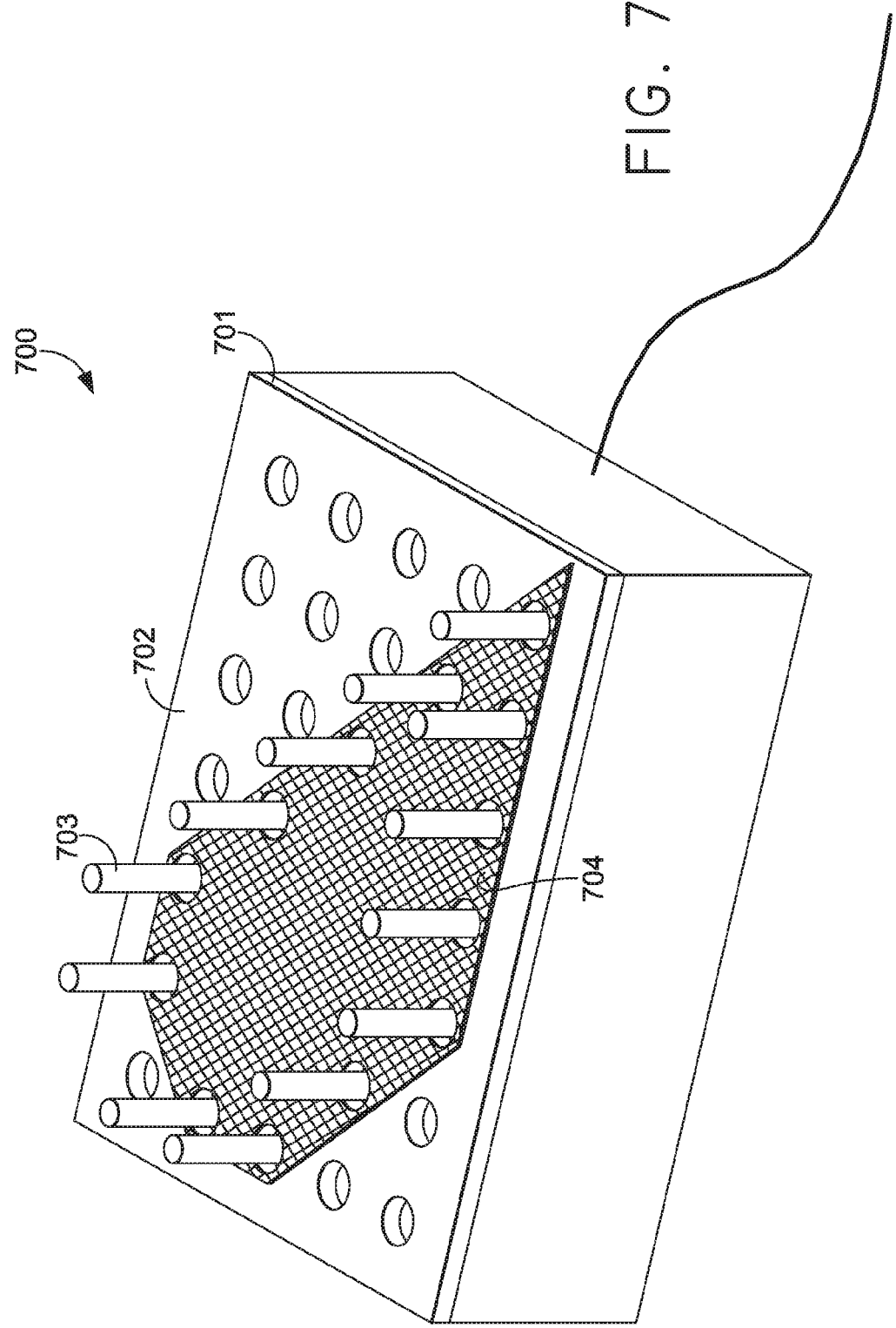
FIG. 7 depicts an exemplary system for aligning materials, in accordance with an exemplary aspect hereof.

Turning now to FIG. 7, an exemplary pin plate alignment system 700 is illustrated. The system 700 includes a number of extended pins, such as extended pin 703, which extend beyond a face 702 of a solid plate 701. These extended pins may be referred to as "alignment pins," because as illustrated, these pins may be used to align a material 704. For instance, the alignment pins may reversibly fix the material 704, such that the material 704 may be fixed in place during manufacturing processes, and then released from the alignment system 700 when the processes are complete. In one example, the alignment pins are arranged according to an extension pattern, such as the extension pattern 600 of FIG. 6A. As mentioned, the set of pins that is selected for aligning a material may be based on a pattern and/or design for a material. This may include a pattern and/or design for an article that is at least partially constructed from one or more materials.

Although not shown in FIG. 7, the system 700 may further include a set of retracted pins beneath the face 702 of the solid plate 701. These retracted pins may be extended and/or the extended pins may be retracted during subsequent manufacturing steps. This individual movability of each pin between an extended and/or retracted position may accommodate various processes, such as stitching, fusing, printing, lasering, and the like. Furthermore, assembly may involve aligning a rigid or semi-rigid backing piece on the extended pins and then stacking a material on top of pins for alignment. The rigid or semi-rigid piece, such as card stock, paper, felt, and the like, may provide additional support for assembly and for transporting materials between manufacturing equipment. The backing piece may ultimately be removed. Additionally or alternatively, the backing piece may become part of the finished article.

Figure 8:
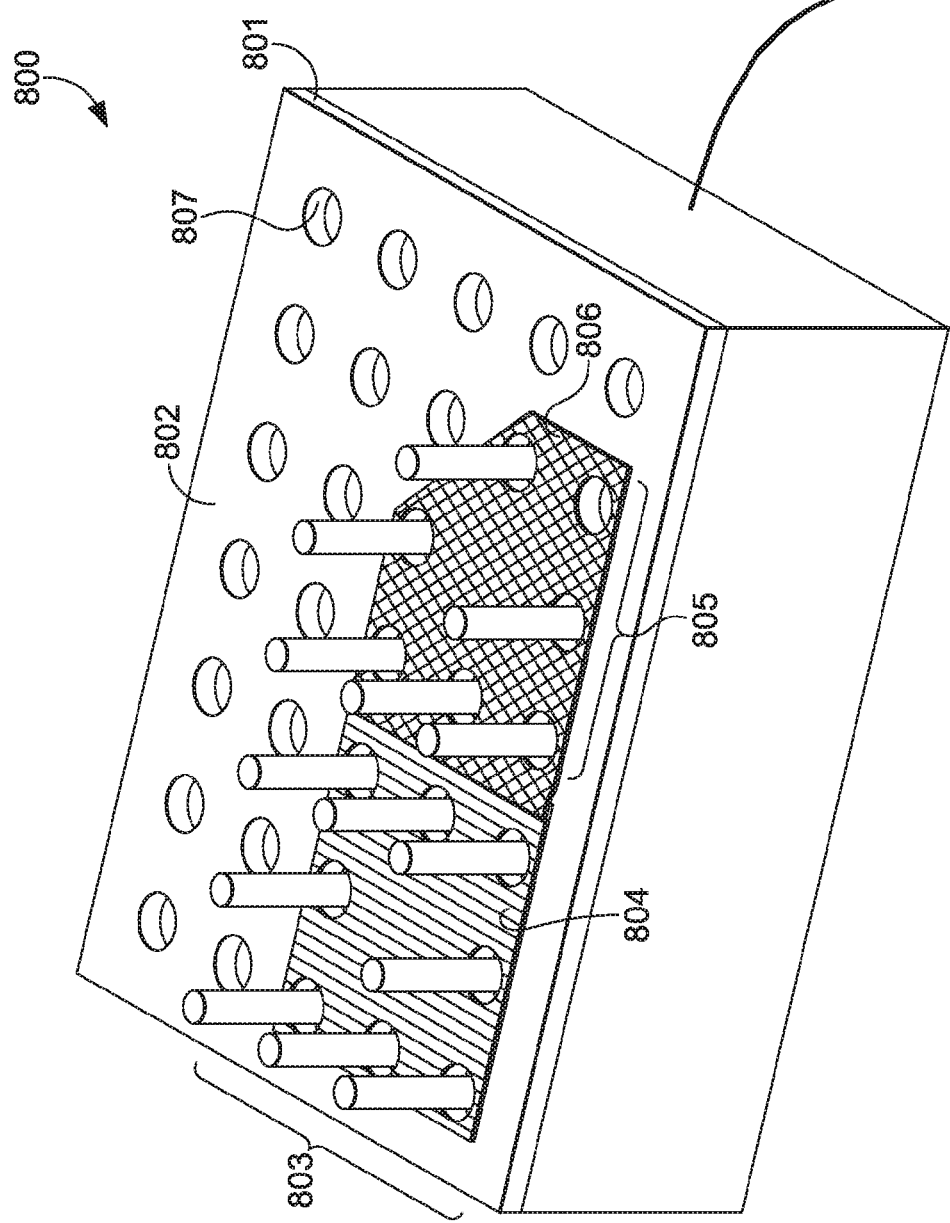
FIG. 8 depicts an exemplary system for aligning materials, where multiple materials are being aligned, in accordance with an exemplary aspect hereof.

FIG. 8 illustrates an exemplary pin plate alignment system 800 for aligning multiple materials. As previously explained, the materials to be aligned may be flexible, semi-flexible, semi-rigid, rigid, or a combination of these and other characteristics. A first set of alignment pins 803 for aligning a first material 804 is illustrated, as well as a second set of alignment pins 805 for aligning a second material 806. Regarding the first set of alignment pins 803 and the second set of alignment pins 805, at least a portion of the length of these alignment pins extend beyond a face 802 of a solid plate 801. In particular, these pins may extend through an array of holes, such as the hole 807, in the solid plate 801.

In one example, the first material 804 may be aligned and processed first. In exemplary aspects, during the processing of the first material, the first set of alignment pins 803 may be in an extended position, while the second set of alignment pins 805 may be in a retracted position. For example, the first set of alignment pins 803 may be secured and/or locked in the extended position and the second set of alignment pins 805 may be secured and/or locked in the retracted position, such that the second set of alignment pins 805 are out of the processing field while the first material 804 is being processed. At an appropriate time, such as when the manufacturing process indicates that the second material 806 may be added, the second set of alignment pins 805 may be extended and the second material 806 may be aligned and processed. The first set of alignment pins 803 may remain extended. Additionally or alternatively, the first set of alignment pins 803 may be at least partially retracted.

In exemplary aspects, multiple sets of alignment pins may be extended to accommodate multiple pieces of material to be used in the construction of an article, such as a shoe or other flexible article. As the manufacturing process progresses, fewer alignment pins may be required to align the multiple pieces of material. In this instance, a fraction of the alignment pins that were initially in an extended position may be retracted. This retraction may accommodate various processing steps.

In additional aspects, a fraction of the alignment pins that were initially extended may be at least partially retracted during various stages of the manufacturing process. For example, at a particular stage of the manufacturing process, a fraction of the first set of alignment pins 803, a fraction of the second set of alignment pins 805, and/or alignment pins not included in either of these sets may be at least partially retracted to accommodate that particular stage of the manufacturing process.

Figure 9:
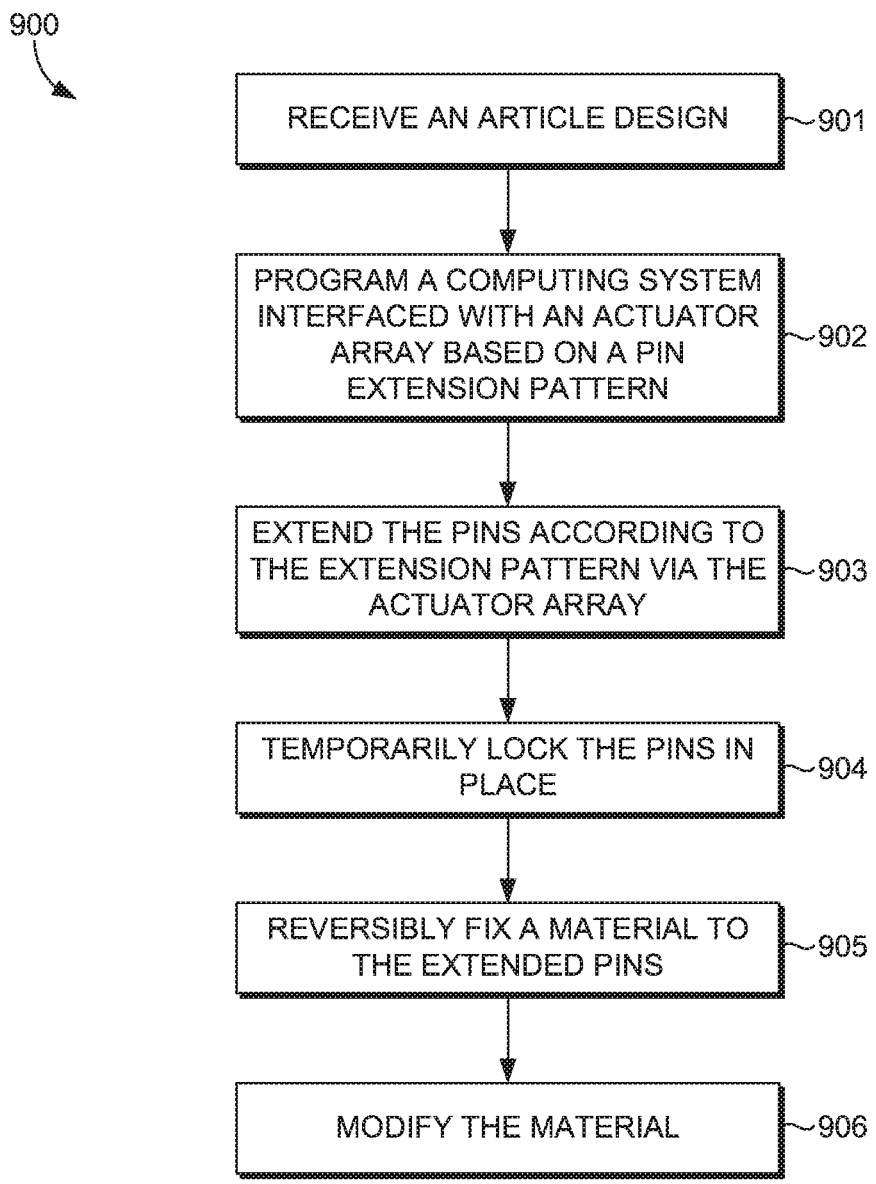
FIG. 9 depicts a flow diagram of an exemplary method for aligning materials in order to construct an article of manufacture, in accordance with an exemplary aspect hereof.

Turning now to FIG. 9, a flow diagram 900 illustrates an exemplary method for aligning materials in order to construct an article that is at least partially constructed of one or more materials. At step 901, an article design, a design and/or pattern for a shoe or an apparel item, may be received. A pin extension pattern may be determined based on the design, pattern, and/or materials to be used in the construction of the article. At step 902, a computing system that is interfaced with an actuator array may be programmed based on the pin extension pattern. Additionally or alternatively, the computing system may determine the pin extension pattern based on the design, pattern, and/or materials to be used in the construction of the article. At step 903, the actuator array, which may individually actuate each extendable pin in an array of pins, may then extend the pins according to the extension pattern. The actuator array may extend the designated pins in unison, sequentially, in groups, or in any other order. The pins may be temporarily locked in the place at step 904. As previously described, locking the pins in place may ensure that the pins in an extended position remain in the extended position and the pins in a retracted position remain in the retracted position behind the face of the solid plate. In another example, the pins may be extended in a way such that locking is not necessary. Additionally, in some instances, it may be desirable to provide "give" in an extended pin, and accordingly, the pin may be fixed such that a desired degree of movement is permitted.

At step 905, the material to be aligned may be reversibly fixed to the extended pins. The material may be fixed via pre-formed holes in the material, by using the pins to punch holes in the material, and/or by any other appropriate means. The aligned material may be modified at step 906. Multiple modifications may be made to the material. These modifications may include an initial tacking of the aligned material and moving the material between pieces of manufacturing equipment. The aligned material may also be moved to additional arrays of pins with different geometries to accommodate additional materials and/or modifications. Modifications may include any combination of processing steps, such as stitching, forming, fusing, printing, dyeing, pressing, welding, embroidering, lasering, and the like. In one example, multiple materials may be aligned and modified simultaneously. In further examples, multiple materials may be aligned and modified in sequence and/or in batches. After the material has been modified, the material may be released. At this time, the extended pins may be at least partially retracted. Additionally or alternatively, the extended pins may remain extended to receive one or more additional pieces of material.

Figure 10:
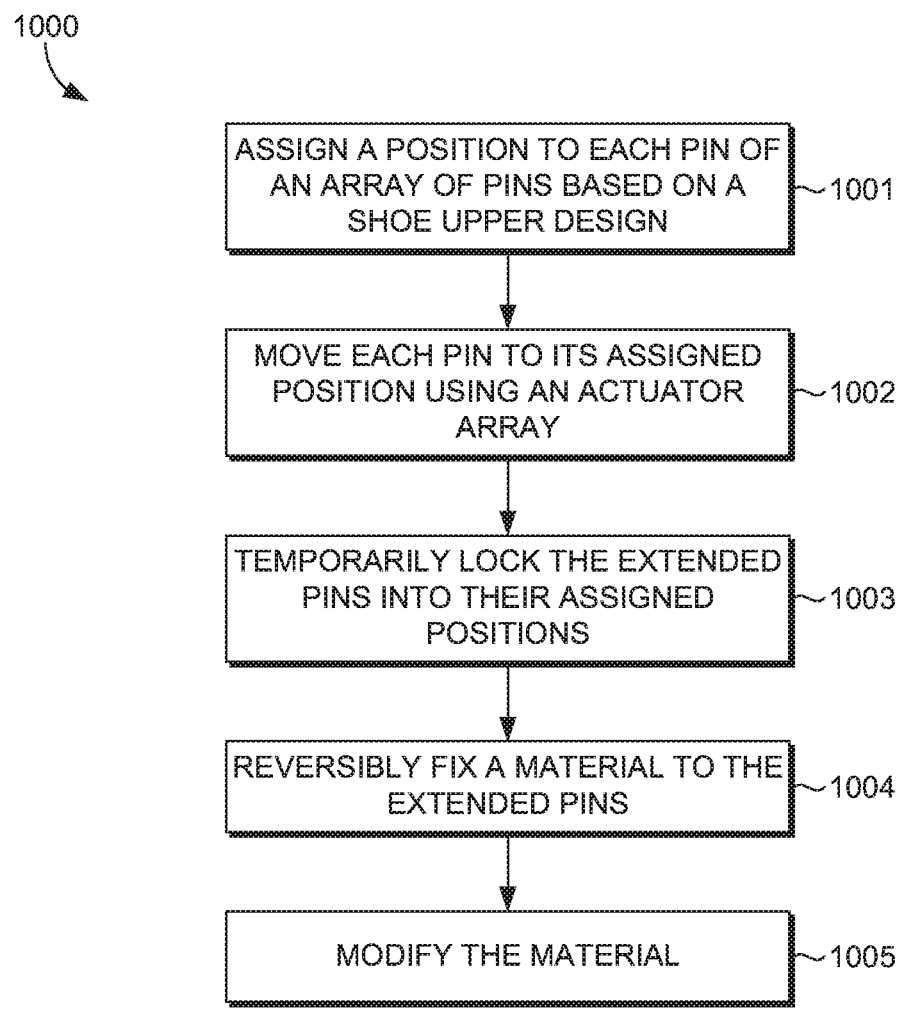
FIG. 10 depicts a flow diagram of an exemplary method for aligning materials in order to construct a shoe upper, in accordance with an exemplary aspect hereof.

In FIG. 10, a flow diagram 1000 illustrates an exemplary method for aligning materials in order to construct a shoe upper. At step 1001, each pin of an array of pins may be assigned a position. The position may include either an extended position, where at least a portion of the pin body extends beyond a face of a solid plate, or a retracted position, where the body of the pin is behind the back and/or face of the solid plate. The positions may be assigned based upon a pattern for an article of manufacture, such as a shoe or, for example, a shoe upper. The positions may be assigned by a designer or engineer or other person(s) involved. Additionally or alternately, the positions of the pins may be assigned by a computing program that determines an extension pattern based upon the design and/or pattern for the article of manufacture.

At step 1002, each pin may be moved to its assigned position using an actuator array. For example, the actuator array may individually actuate each pin, such that pins assigned to an extended position are extended and pins assigned to a retracted position are retracted. At step 1003, the pins may be temporarily locked into their assigned positions. In one example, the extended pins may be locked into position. Additionally or alternatively, the retracted pins may be locked into position. In another example, the extended pins may be fixed in a position such that a desired degree of movement is permitted, in order to, for example, provide some "give" in the extended pins.

At step 1004, the material used to construct the shoe upper, or other article, may be reversibly fixed to the extended pins. The material may be reversibly fixed via preformed holes in the material, by using the pins to punch holes in the material, and/or by a number of other means. The material may be modified at step 1005. Modification may include one or more of stitching, fusing, lasering, cutting, pressing, welding, embroidering, printing, and any number of other modifications. Multiple modifications may be applied to a material. Modifications may further include moving the aligned material between pieces of machinery. The aligned material may also be moved to additional arrays of pins with different geometries to accommodate additional materials and/or modifications. Following the modification, the material may be released and the pins may be retracted. In another example, this first material may remain aligned and another set of alignment pins may extend to receive other materials to be modified in conjunction with the first material. In another example, the first material may be released and the pins may remain locked in position to receive one or more additional pieces of material for alignment.

As described above, aspects hereof may include, among other things, a method, a system, and an apparatus, each of which may include components and/or steps related to a computer system. In one aspect, the computer system may include a computing device, such as the exemplary computing device 1100 depicted in FIG. 11. Computing device 1100 is but one example of a suitable computing system and is not intended to suggest any limitation as to the scope of use or functionality of aspects. Neither should the computing device 1100 be interpreted as having any dependency or requirement relating to any one or combination of components illustrated. Moreover, aspects may also be practiced in distributed computing systems where tasks are performed by separate or remote-processing devices that are linked through a communications network.

Figure 11:
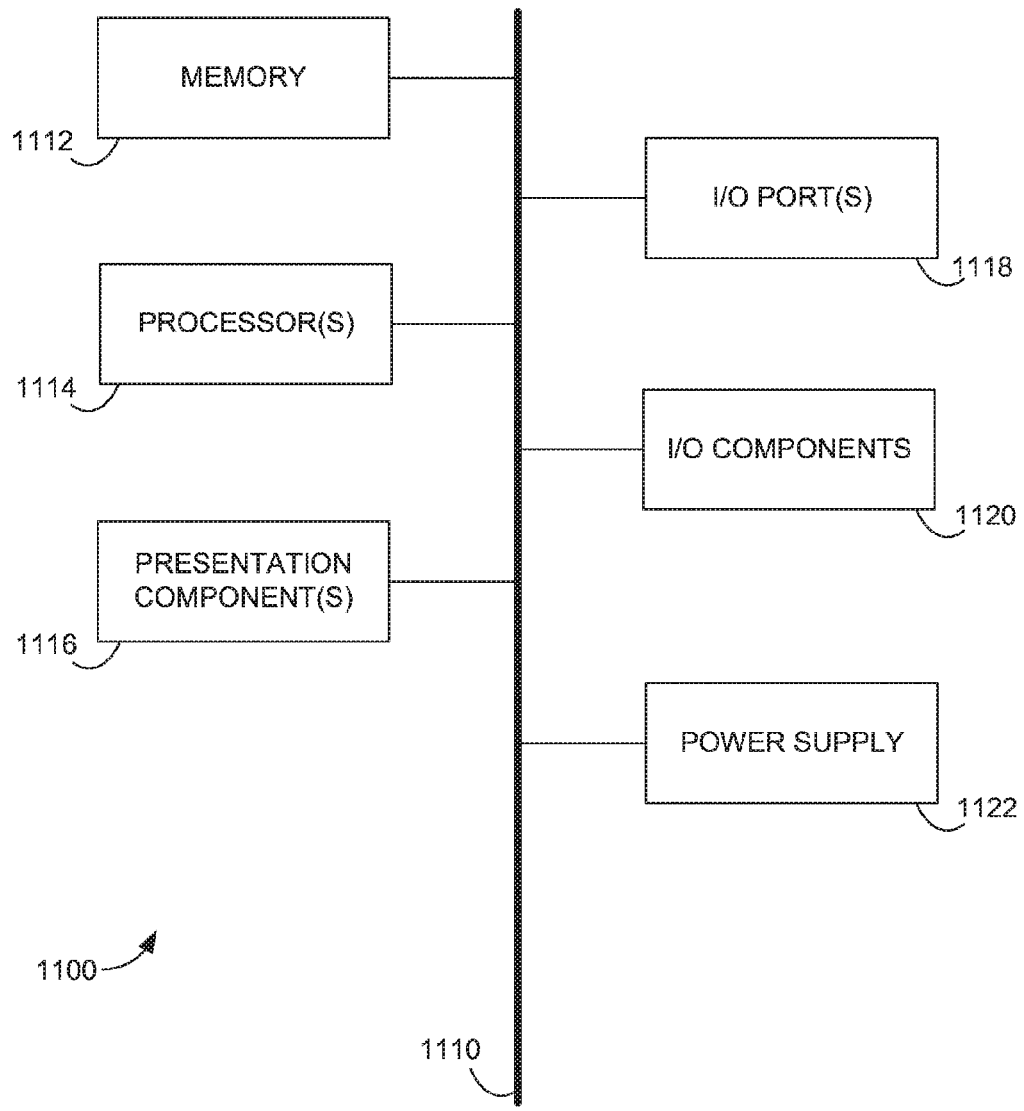
FIG. 11 depicts a block diagram of an exemplary computing device that may be used with a system for aligning materials, in accordance with an exemplary aspect hereof.

Computing device 1100 may have a bus 1110 that directly or indirectly couples the following components: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, processors may have memory.

Computing device 1100 typically may have a variety of non-transitory computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 1100.

Memory 1112 is comprised of tangible computer-storage media in the form of volatile and/or nonvolatile memory. Memory 1112 may be removable, nonremovable, or a combination thereof. Exemplary hardware devices are solid-state memory, hard drives, optical-disc drives, etc.

Computing device 1100 is depicted to have one or more processors 1114 that read data from various entities such as memory 1112 or I/O components 1120. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

Presentation component(s) 1116 present data indications to a user or other device. Exemplary presentation components are a display device, speaker, printing component, light-emitting component, etc. I/O ports 1118 allow computing device 1100 to be logically coupled to other devices including I/O components 1120, some of which may be built in.

In the context of the present aspects, the computing device 1100 may be used to determine operations of various components of a system for aligning materials, such as the exemplary systems 300, 400, 500, 700, and 800 of FIGS. 3, 4, 5, 7, and 8, respectively. For example, a computing device may be programmed based on an extension pattern for an extendable array of pins. Additionally or alternatively, the computing device may ascertain an extension pattern for a pin plate alignment system based on a design and/or pattern for an article. Based on the extension pattern, the computing device may cause an actuator array to extend and/or retract one or more pins within an array of pins, and may also control the locking and unlocking of the pins via a locking system.

Many different arrangements of the various components depicted, as well as components not shown, are possible without departing from the scope of the claims below. Aspects of the technology have been described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for aligning one or more materials to construct an article, the method comprising:
    programming a computing system interfaced to an actuator array, the programming based on an extension pattern for an extendable array of pins, wherein the extension pattern determines alignment pins that are to be in an extended position, the alignment pins comprising a set of the extendable array of pins, and any remaining pins in the extendable array of pins that are outside of the set comprising retracted pins;
    using the actuator array, extending the alignment pins through an array of holes in a plate having a face and a back such that the alignment pins, when in the extended position, extend at least partially beyond the face of the plate, while the retracted pins are in a retracted position, such that the retracted pins are retracted behind the back of the plate;
    reversibly fixing the one or more materials to the alignment pins; and
    modifying the one or more materials.

2. The method of claim 1, wherein the extension pattern includes two sets of pins within the extendable array of pins, the two sets comprising an alignment pin set and a retracted pin set.

3. The method of claim 2 further comprising:
    at least partially retracting a fraction of the alignment pin set initially extended.

4. The method of claim 1, further comprising locking the extendable array of pins, such that the alignment pins are fixed in the extended position and the retracted pins are fixed in the retracted position.

5. The method of claim 4, further comprising unlocking the alignment pins and using the actuator array to retract the alignment pins through the array of holes such that the alignment pins are retracted behind the back of the plate.

6. The method of claim 1, wherein modifying the one or more materials comprises one or more of printing, sewing, or fusing the one or more materials.

7. The method of claim 1, wherein the extension pattern is based on a design for a shoe upper and materials to be aligned during construction of the shoe upper.

8. The method of claim 1 further comprising determining the alignment pins that are to be in the extended position based upon a diameter of the alignment pins needed, wherein the diameter of the alignment pins needed is based upon the one or more materials to be aligned.

9. The method of claim 1, wherein a diameter of each pin is between about 1 millimeter and about 10 millimeters.

10. The method of claim 9, wherein the diameter of each pin is about 3 millimeters.

11. The method of claim 1, further comprising determining the alignment pins that are to be in the extended position based upon a geometry of the alignment pins needed, wherein the geometry of the alignment pins needed is based upon the one or more materials to be aligned.

12. The method of claim 1, wherein the extendable array of pins includes greater than 1000 pins and the array of holes includes greater than 1000 holes.

13. The method of claim 1, wherein each pin of the extendable array of pins has a pin length, and for each extended pin of the extendable array of pins that is in the extended position, a portion of the pin length that extends beyond the face of the plate is less than or equal to the pin length.

14. A method for aligning one or more materials to construct a shoe upper, the method comprising:
    based on a design for the shoe upper, assigning to each pin of an array of pins either an extended position or a retracted position;
    using an actuator array configured to independently actuate each pin of the array of pins, moving each pin of the array of pins to its assigned position, such that each extended pin assigned to the extended position extends at least partially beyond a face of a plate through a hole of an array of holes in the plate, the array of holes extending from a back of the plate to the face of the plate, and each retracted pin assigned to the retracted position is retracted behind the face of the plate;

reversibly fixing at least one material of the one or more materials used to construct the shoe upper to each extended pin in the extended position; and modifying the at least one material.

15. The method of claim 14, wherein the at least one material is a textile.

16. The method of claim 14, wherein the at least one material is a rubber.

17. The method of claim 14, wherein the at least one material is a hard plastic.

18. One or more non-transitory computer-readable media having computer-executable instructions thereon that, when executed by one or more processors, cause the one or more processors to perform a method for aligning one or more materials to construct an article, the method comprising:

based upon an extension pattern, determining which pins of an array of pins should be in an extended position, the pins which are determined need to be in the extended position comprising a set of pins;

sending a first indication to an actuator system configured to individually actuate each pin of the array of pins to move the set of pins to the extended position, such that each pin in the extended position extends at least partially beyond a face of a plate through a hole of an array of holes in the plate, the array of holes extending from a back of the plate to the face of the plate; and after reversibly fixing at least one material of the one or more materials to the set of pins and modifying the at least one material, sending a second indication to the actuator system to move the set of pins to a retracted position, such that each pin in the retracted position is retracted behind the face of the plate.

19. The one or more non-transitory computer-readable media of claim 18, wherein the method further comprises receiving the extension pattern.

20. The one or more non-transitory computer-readable media of claim 18, wherein the method further comprises sending a third indication to the actuator system to temporarily lock the set of pins in the extended position.

* * * * *